United States Patent [19]

Nacar

[11] Patent Number: 5,082,302
[45] Date of Patent: Jan. 21, 1992

[54] HAND CRANK BICYCLE DRIVE

[76] Inventor: Ernesto M. Nacar, 5 Hedley Court, Brampton, Ontario, Canada, L6S 2B6

[21] Appl. No.: 685,967

[22] Filed: Apr. 15, 1991

Related U.S. Application Data

[63] Continuation of Ser. No. 453,957, Dec. 20, 1989, abandoned.

[30] Foreign Application Priority Data

Jul. 26, 1989 [CA] Canada ................... 606713

[51] Int. Cl.5 ............................................. B62M 1/12
[52] U.S. Cl. .................... 280/234; 280/240; 280/250; 74/142; 74/502.2; 74/557
[58] Field of Search ............... 280/230, 233, 234, 240, 280/242.1243, 244, 249, 250; 74/142, 143, 557, 502.2; 403/16, 359

[56] References Cited

U.S. PATENT DOCUMENTS

| | | |
|---|---|---|
| 582,315 | 5/1897 | Quinn . |
| 605,559 | 6/1898 | Taylor . |
| 608,825 | 8/1898 | Bieber . |
| 632,797 | 9/1899 | Van Horn ................ 280/234 |
| 641,926 | 1/1900 | Bollinger ................ 280/234 |
| 2,390,719 | 12/1945 | Kurth . |
| 3,193,305 | 7/1965 | Hendricks . |
| 4,502,705 | 3/1985 | Weaver . |
| 4,773,662 | 9/1988 | Phillips ................ 280/230 X |
| 4,896,559 | 1/1990 | Narier et al. ................ 74/551.4 |

FOREIGN PATENT DOCUMENTS

| | | |
|---|---|---|
| 1029058 | 4/1978 | Canada . |
| 3239548 | 4/1984 | Fed. Rep. of Germany ...... 280/234 |
| 12705 | 6/1896 | Switzerland . |

*Primary Examiner*—Charles A. Marmor
*Assistant Examiner*—Victor E. Johnson
*Attorney, Agent, or Firm*—Jeffers, Hoffman & Niewyk

[57] ABSTRACT

A dual drive bicycle having a steerable front wheel and a rear wheel that is driven. A foot-powered drive system includes a first rotatable shaft extending transversely to the bicycle. A rotatable drive sprocket is operatively connected to a second shaft rotatably mounted on the steering post in which the front wheel is mounted. A rotatable driven sprocket is mounted on the first shaft and is capable of rotating same for forward drive. A continuous drive chain extends about the drive sprocket and the driven sprocket. A third rotatable shaft is mounted on the steering spindle so as to pivot with the front wheel when the latter is steered. A universal joint connects the second and thrid shafts at a location above the steering shaft. A further continuous chain and cooperating sprockets together with a handcrank are provided to rotate the third shaft.

22 Claims, 7 Drawing Sheets

HAND CRANK BICYCLE DRIVE

This is a continuation of division of U.S. Pat. application Ser. No. 453,957, filed Dec. 20, 1989, now abandoned.

BACKGROUND OF THE INVENTION

This invention relates to bicycles or velocipedes.

The standard form of bicycle has been in use for a considerable number of years and is widely accepted. This bicycle comprises a steerable front wheel, a driven rear wheel, a rigid frame on which these wheels are rotatably mounted, a handle bar used to steer the bicycle and a seat mounted on the frame. Although these bicycles are generally acceptable, they do suffer from the limitation that they are only driven by the use of leg muscles while the rider's hands and arms are only used to steer the bicycle and as a means for balance. Although there have been proposals in the past for providing a bicycle that is not only foot-powered but is also hand-powered, as far as the applicant is aware, none of such proposals have been successful or have come into general use. It appears that a significant problem with prior proposals for providing a hand-powered drive system for a bicycle is that it is difficult to transmit power from the region of the bicycle where the hands are normally located and where they are used to steer the bicycle to the drive wheel of the bicycle. These problems arise in part from the fact that the rider's hands must at all times be available for steering the bicycle while they are providing the power to the drive wheel.

Early U.S. Pat. No. 632,797 issued Sept. 12, 1899, to G. Van Horn describes a bicycle with a handle-bar constructed to form a crank-shaft used to provide drive power to the rear wheel of the bicycle. The rotatable handle-bar turns a sprocket wheel which turns an auxiliary driven sprocket located adjacent to the usual sprocket that is turned by the foot pedals. The two sprockets are connected by means of a continuous chain of considerable length. An obvious difficulty with this proposal is that the continuous chain must be twisted when the front wheel is turned in order to steer the bicycle.

Another hand powered drive is described in early U.S. Pat. No. 582,315 issued May 11, 1897 to M. Quinn. A crank handle-bar is journaled in a T-head mounted on the steering-spindle. An upper sprocket is mounted at the front of the frame and is connected by a continuous chain belt to a small sprocket-wheel mounted adjacent to the usual sprocket that is turned by the foot pedals. There is an upright cup within the T-head that is connected with a crank shaft on the head. A pitman-rod is journaled at one end on the crank of the handle bar and this is provided to rotate the upper sprocket-wheel by hand power.

It is an object of the present invention to provide a velocipede with a steerable front wheel that can be powered by the use of the rider's hands and arms and that is relatively easy to operate.

It is another object of the present invention to provide a reliable mechanism for permitting a bicycle to be powered either by the user's legs or by the user's arms and hands or by both means. Moreover, the present arrangement does not interfere with the user's abilities to steer the bicycle in a relatively normal fashion at all times.

SUMMARY OF THE INVENTION

According to one aspect of the invention, a dual drive bicycle comprises a rigid frame including a steering post arranged forwardly on the frame, a steerable front wheel and means for rotatably mounting the front wheel to the frame including a generally upright steering spindle pivotally mounted in the steering post. The steering spindle and post define a steering axis extending centrally therethrough. A rear wheel is rotatably mounted on the frame and is driven by a foot-powered mechanism that includes a first rotatable shaft extending transversely to the frame and mounted on the frame. A rotatable drive sprocket is operatively connected to a rotatable second shaft supported by the steering spindle. This drive sprocket is spaced from the steering axis in the transverse direction of the bicycle. There is a rotatable driven sprocket mounted on the first shaft and capable of rotating same in a forward drive direction. A continuous drive chain extends about the aforementioned drive sprocket and driven sprocket. A third rotatable shaft is mounted on the steering spindle so as to pivot with the front wheel when the latter is steered. A universal joint connects the second and third shafts at a location above the steering shaft. There are means for rotating the third shaft and hence the second shaft, which means includes a hand-crank.

In the preferred embodiment, the aforementioned rotating means for the third shaft includes another driven sprocket fixedly connected to the third shaft, another drive sprocket fixedly connected to the hand-crank to rotate therewith and another continuous drive chain extending about these two sprockets.

According to another aspect of the invention, there is provided a bicycle having a frame, a steerable front wheel, and means for rotatably mounting the front wheel on the frame for purpose of steering, this mounting means including a steering post. This bicycle has hand-powered drive means for the rear wheel, said drive means including a rotatable drive sprocket operatively connected to a shaft mechanism rotatably mounted on the frame. A rotatable driven sprocket is operatively connected to the rear wheel in order to rotate same. A continuous drive chain extends about these drive and driven sprockets. A mechanism is provided for rotating the shaft mechanism and these means include a hand-crank. The shaft mechanism comprises first and second shaft sections connected by a universal joint to permit the shaft mechanism to bend as the bicycle is steered. This joint is located directly above the steering post at the front of the frame.

In the preferred embodiment, the shaft mechanism comprises first and second shaft sections connected by the universal joint and this joint is located directly above a steering post at the front of the frame.

According to a further aspect of the invention, a bicycle comprises a rigid frame including a steering post arranged forwardly on the frame, a steerable front wheel and a mechanism for rotatably mounting the front wheel to the frame including a generally upright steering spindle pivotable mounted in the steering post. A rear wheel is rotatably mounted on the frame as well. A hand-powered drive mechanism is provided for rotating one of the wheels. This drive mechanism includes a hand-crank rotatably mounted on the steering spindle. There are brakes for arresting the forward motion of the bicycle and brake operating mechanisms mounted on the hand-crank and operatively connected to the brakes. "The operating mechanism includes at least one hand lever mounted on the hand-crank and capable of rotating thereon when the hand-crank is rotated. There are means for holding the hand lever at a selected angular position on the hand-crank so that the angular position of the hand lever relative to a central axis of an adjacent handle of the hand-crank remains generally the same during rotation of the hand-crank."

Further features and advantages will become apparent from the following detailed description taken in conjunction with the accompanying drawings.

DETAILED DESCRIPTION OF PREFERRED EMBODIMENTS

Figure 1:
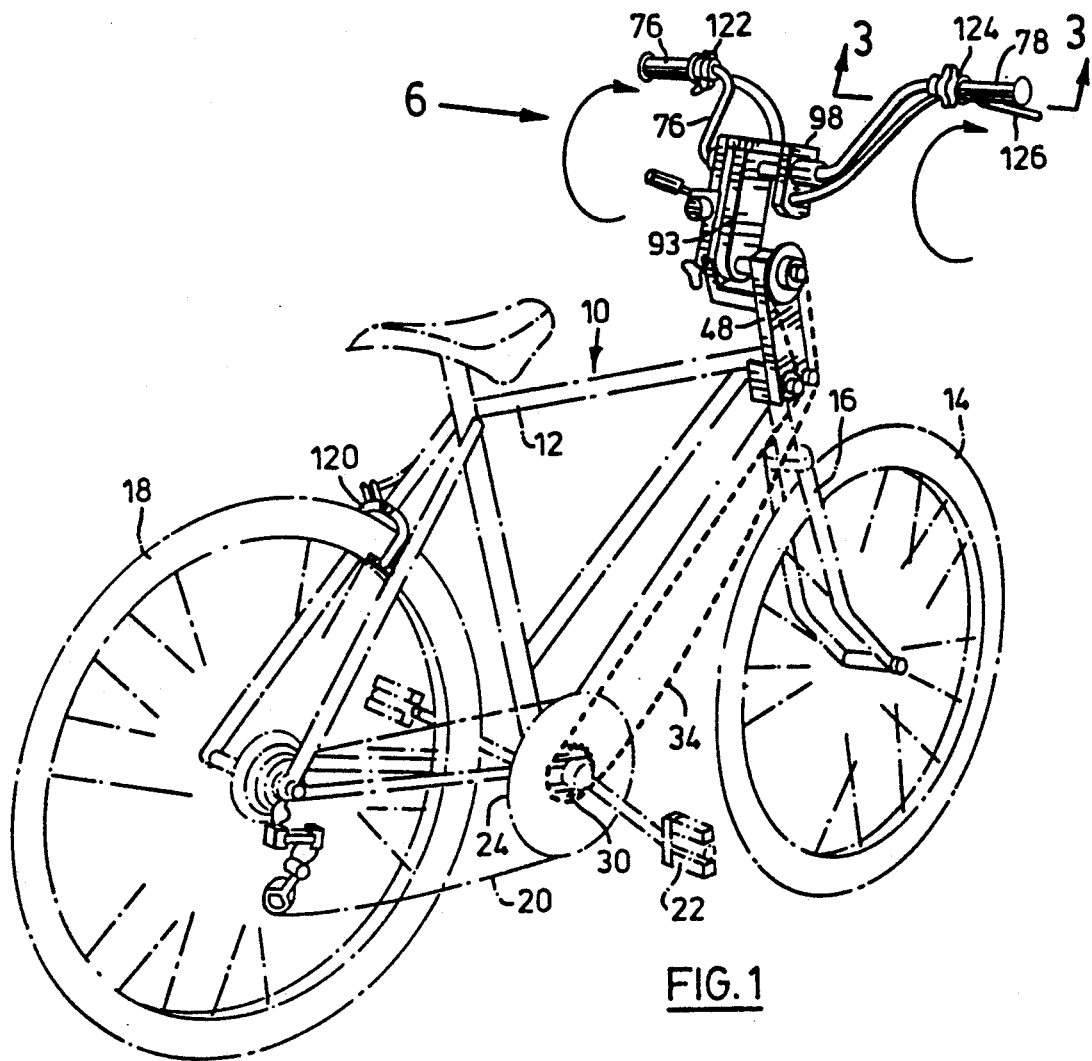
FIG. 1 is a perspective view of a bicycle constructed in accordance with the invention with the standard components of the bicycle only outlined in dashed lines and the novel components illustrated in solid lines.

A bicycle 10 constructed in accordance with the invention has a number of standard components including a rigid tubular frame 12, a steerable front wheel 14 mounted between two forks 16 and a rear wheel 18 to which drive is transmitted through a continuous drive chain 20. There is a foot-powered drive mechanism for rotating the rear wheel in a forwards direction and this mechanism includes the usual foot pedals 22. As is well known, these foot pedals are connected to a rotatable shaft on which is mounted a large sprocket wheel 24. The drive chain 20 extends around this sprocket wheel and around either a single smaller sprocket or one of several smaller sprockets located at the axle of the rear wheel 18.

Figure 8:
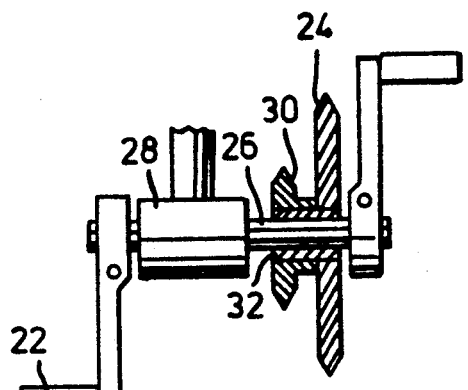
FIG. 8 is a detail view, partly in axial cross-section illustrating the clutch mechanism on the shaft to which the foot pedals are connected.

The rotatable shaft to which the foot pedals are connected can be seen clearly in FIG. 8 of the drawings. This shaft, hereinafter referred to as the first shaft 26 is rotatably mounted in a sleeve 28 rigidly connected to the frame. Rotatably mounted adjacent to the aforementioned sprocket wheel 24 and fixedly attached thereto is a driven sprocket 30. These two sprockets are mounted on the first shaft 26 and are capable of rotating same in a forward drive direction through a single one way drive clutch located at 32. This clutch can be a common drawn cup (DC) roller clutch such as Model FC-25 available from The Torrington Company, Bearings Division of Torrington, Conn. In a known manner, a suitable racer to accommodate the roller clutch is fitted on the shaft 26. As such one way clutches are well known in the art, a detailed description thereof is deemed unnecessary.

As shown in FIG. 1, a continuous drive chain 34 extends about the driven sprocket 30 and extends downwardly at an angle from the region of the steering column for the bicycle. It will be appreciated that it is this drive chain 34 that provides the means for transmitting drive power from a hand operated drive means to the sprocket wheel 24 and hence to the drive chain 20 and hence to the rear wheel 18.

Figure 2:
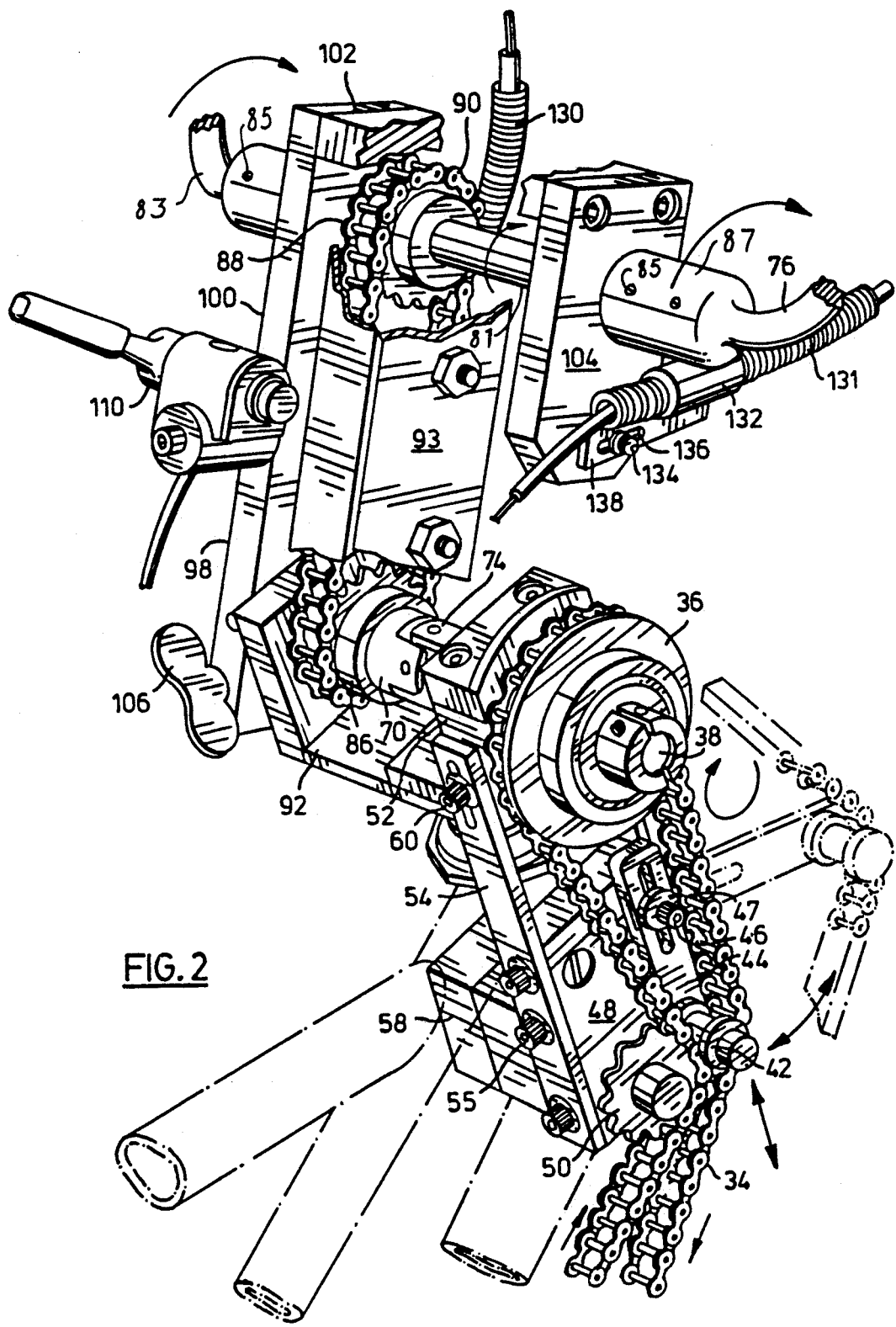
FIG. 2 is a detailed perspective view illustrating a rotatable drive sprocket mounted on the steering post and a shaft mechanism that includes a universal joint for rotating this sprocket.
Figure 4:
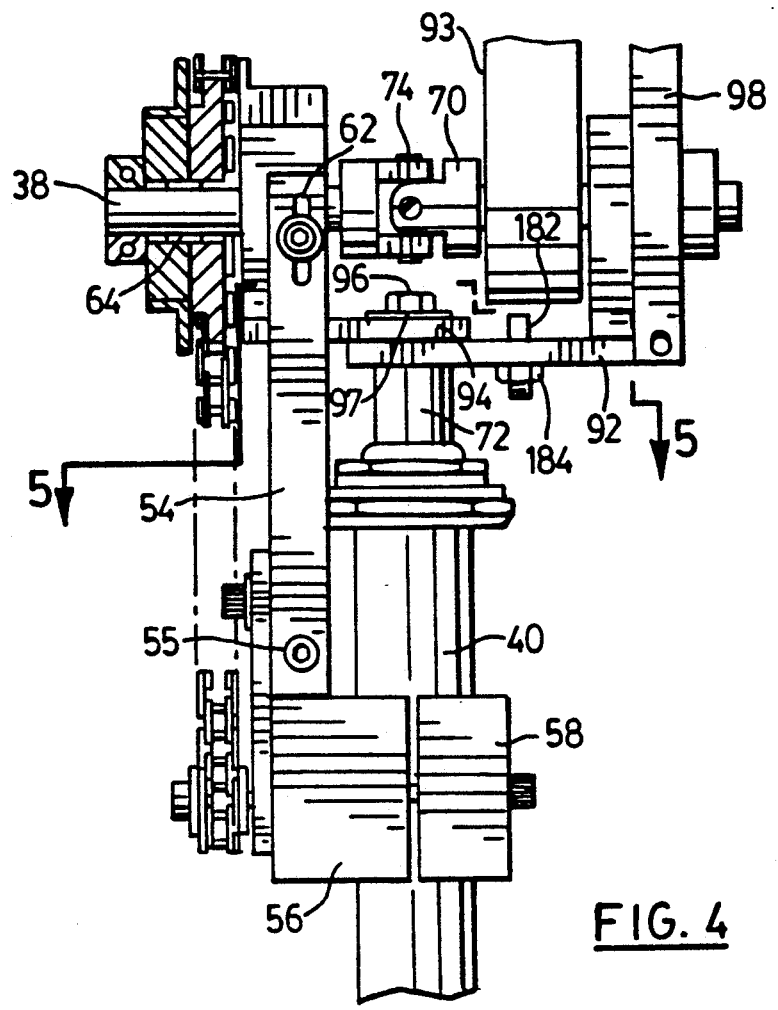
FIG. 4 is a detailed view illustrating the mechanism at the top of the steering post including the universal joint and the shaft sections connected thereto.

Reference will now be made to FIGS. 2 and 4 which illustrate in detail the mechanism that is connected to the upper section of the aforementioned drive chain 34. At its upper end the drive chain extends around a rotatable drive sprocket 36 connected to a shaft 38 (herein sometimes referred to as the second shaft and preferably having a diameter of ½ inch) rotatably mounted on and above a steering spindle located in steering post 40. In order to keep the chain 34 tight, there is an adjustable roller 42 rotatably mounted on adjustment arm 44. The position of this arm can be adjusted to keep the chain tight by loosening and tightening an adjustment bolt 46 which bears against washer 47. The bolt 46 threads into a mounting plate 48. The continuous chain also extends around a small sprocket 50 which is rotatably mounted in the plate 48. The sprocket 50 keeps the upper path of the chain in a relatively low position so that it does not interfere with the rider's legs. It will be understood that preferably the chain 34 is covered by a metal guard or shield (not shown).

A metal block 52 is mounted on and above the steering post on two upright arms 54, the bottom ends of which are mounted to the sides of the aforementioned plate 48 by means of bolts 55. The plate 48 has a thick bottom section 56 that forms one half of a clamping block used to mount the second shaft 38. The other half is formed by attaching plate 58. The two adjacent plates are bolted together so as to clamp the adjacent steering post 40. It will be noted that the vertical position of the block 52 can be adjusted by means of adjusting bolts 60 located at the upper end of the two arms 54. These bolts extend through vertical slots 62 formed near the top of the arms. It must be further noted that located between the shaft 38 and the drive sprocket 36 is a power transfer roller clutch 64 of per se known construction. This roller clutch permits drive to be transmitted in one direction only from the shaft 38 to the chain 34. One such clutch that is suitable for a ½ inch shaft is Model RCB 081214 available from The Torrington Company, Bearings Division.

A third rotatable shaft or shaft section 70 is mounted on a steering spindle 72 so as to pivot with the front wheel when the latter is steered. A universal joint 74 connects the second and third shafts or shaft sections at a location above and substantially aligned with the steering spindle (see FIG. 4).

Figure 3:
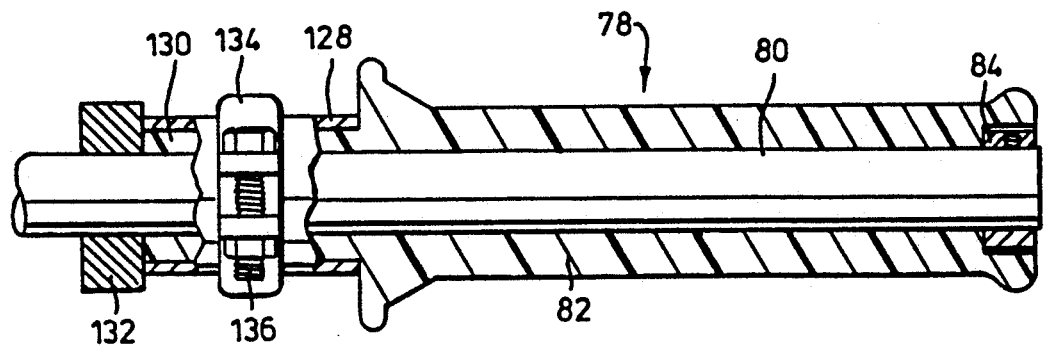
FIG. 3, which appears on the same sheet as FIG. 1, is an axial cross-section illustrating the construction of the handle grip at each end of the hand-crank that doubles as a handle bar.

Means are provided for rotating the third shaft 70 and hence the second shaft 38 and these means include a special hand-crank 76. This symmetrical hand-crank is shaped and sized so that not only does it provide means for transmitting hand power to the rear wheel, but it also serves as a handle bar for steering the bicycle. This hand-crank comprises a U-shaped handle bar and two hand grips 78 at opposite ends of the handle bar. The construction of each handle grip 78 can be seen in more detail in FIG. 3. There is a straight central shaft section 80 on which is rotatably mounted a sleevelike grip 82 secured in place by an end ring 84. The preferred hand-crank 76 is formed from a straight shaft 81 fixedly attached to two crank sections 83 by means of set screws 85. Thus each end of shaft 81 is inserted in a sleeve or cup 87 formed on the end of the respective crank section 83.

In addition to the hand-crank, there are also provided for rotating the third shaft a small driven sprocket 86 fixedly connected to the third shaft, a small drive sprocket 88 fixedly connected to a central section of the hand-crank and a relatively short continuous drive chain 90 extending about the drive sprocket 88 and the drive sprocket 86. Preferably a metal cover or shield extends about the chain 90 and part of this shield 93 is shown in FIG. 2.

Figure 5:
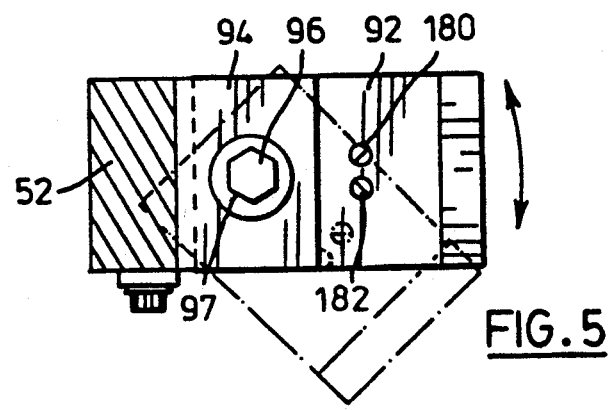
FIG. 5 is a cross-sectional view taken along the line 5—5 of FIG. 4.

There are means for rotatably mounting the third shaft 70 and the hand-crank. The shaft mounting means comprises a L-shaped bracket 92 rigidly connected at one end to the top end of the steering spindle 72 (see FIG. 4). Located on top of the horizontal section of bracket 92 is a horizontal connecting plate 94 which is pivotally connected to the top end of the spindle and rigidly connected to the bottom end of the block 52. The plate 94 provides further lateral support for the block 52. It will be understood that the top end of the spindle is free to rotate in the plate 94 which is held in place by a bolt 96 that extends into the top of the spindle. In a known manner, at the bottom of the spindle 72 there is a dislodging wedge threaded to the bolt 96. A shoulder bushing 97 through which this bolt extends enables the bracket 92 to pivot relative to the plate 94 as shown in FIG. 5. The post or spindle 72 is fastened and locked to an inner bicycle steering sleeve when the bolt 96 is tightened.

Figure 9:
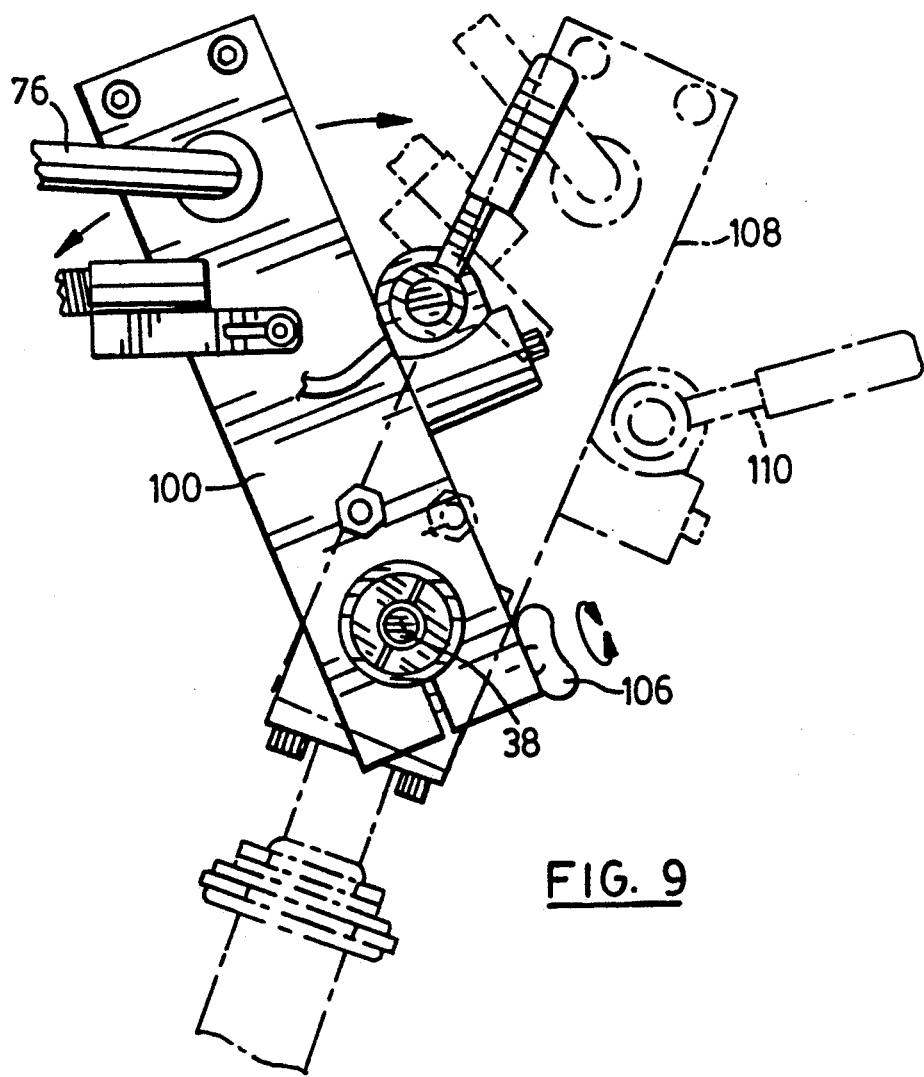
FIG. 9 is another detailed side view showing how the position of the hand-crank can be adjusted to meet the requirements of riders of different sizes.

The hand-crank 76 is mounted in a cantilever supporting frame 98 connected to the bracket 92. This frame 98 includes a long leg 100 pivotally connected to the bracket 92, a connecting section 102 extending at right angles to the leg 100 and a shorter leg 104. The aforementioned drive sprocket 88 is located between the legs 100 and 104. The position of the hand-crank is adjustable by means for pivoting the cantilever supporting frame 98 relative to the bracket. This adjustment is carried out by loosening the wing nut 106 shown in FIG. 2 located near the bottom end of the leg 100. In this way the leg 100 is capable of pivoting relative to the second shaft 38. This is shown in FIG. 9 wherein a forward position of the cantilever supporting frame 98 is indicated in dashed lines at 108. Preferably there are stops provided to limit the pivoting capability of the frame 98 and hand-crank 76 and these stops help prevent wear and tear on the universal joint 74. In the illustrated bicycle, these stops comprise two bolts 180 and 182 threaded into holes in the bracket 92. Nuts 184 can be threaded onto these stop bolts to secure them in place. The tops of these bolts will limit the amount of pivoting by engaging the end of the plate 94 (see FIG. 5). In a preferred embodiment the degree of pivoting permitted is about 45 degrees each side of the centre position.

An optional feature of the illustrated bicycle is a shifting mechanism 110 of per se known construction which enables the rider to change gears. This is done by shifting the drive chain 20 from one size of sprocket at the rear wheel to a smaller or larger sprocket in a known manner. It will thus be understood that the arrangement and construction of the present invention does not hinder or prevent the use of a multi-gear mechanism on the bicycle. The shifting mechanism 110 can conveniently be attached to the rear edge of the long leg 100.

The preferred dual drive bicycle described above can also be provided with one and preferably two hand brakes mounted in the usual manner at the ends of the handle bar which, in the illustrated bicycle, is the hand-crank 76. The brake or brakes of course provide means for arresting the forward motion of the bicycle. For ease of illustration, only the rear brake 120 has been illustrated in FIG. 1 of the drawings, but it will be understood that if desired a front brake of similar construction can be provided for engaging the front wheel 14. Each of these brakes can be constructed in a known fashion and therefore details thereof are deemed unnecessary at this time. It will be understood that each brake is connected by a suitable control cable to its respective brake operating means mounted on the hand-crank 76. Two brake operating means 122 and 124 are shown in FIG. 1, one mounted at each end of the hand-crank. As known, each brake operating means comprises a hand lever 126. The brake operating means including the hand lever is capable of rotating on the hand-crank when the latter is rotated. As illustrated in detail in FIG. 3, each brake operating device includes a sleeve member 128 which is free to rotate on an end portion 130 of the hand grip 78. Both this sleeve portion and the hand grip are held laterally in place by a ring member 132 detachably connected by suitable screws or bolts to the hand-crank. The hand lever 126 is fixedly clamped to the sleeve 128 by clamp 134 which is tightened or loosened by the bolt and nut combination 136.

Figure 6:
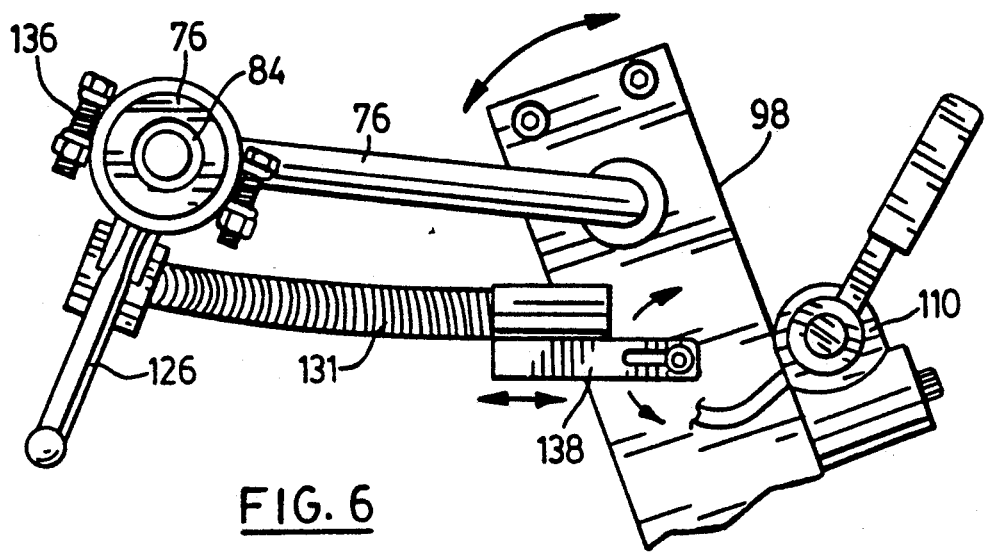
FIG. 6 is a detail side view showing a hand lever for operating one of the brakes mounted on one handle of the hand-crank.
Figure 7:
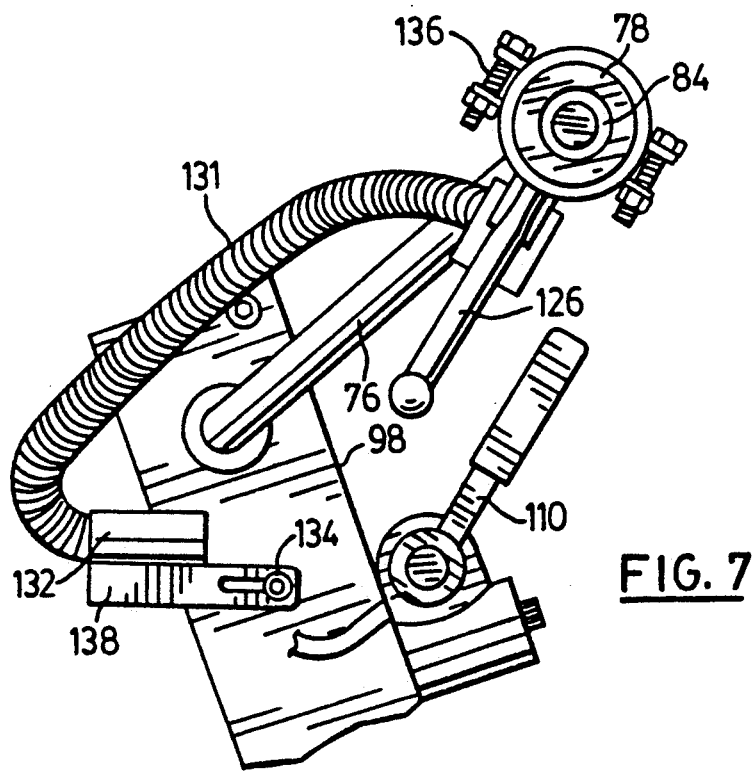
FIG. 7 is a detail side view similar to FIG. 6 but showing the hand-crank in a different position.

Preferably there are means for holding each brake operating means 124 at a desired orientation on the hand-crank 76 independent of the position to which the hand-crank is itself rotated. Tightly wound coil springs are used to house a portion of each cable that connects each lever 126 to its respective brake. These coil springs 131 are adjustably connected to respective ones of the legs 100 and 104. Each spring extends through a tubular member 132, the position of which can be adjusted by a bolt 134 extending through a slot 136. This slot is formed in adjustment plate 138 rigidly connected to the aforementioned sleeve 132. As can be seen from an examination of FIGS. 6 and 7, the coil spring 131 helps to keep the brake lever 126 at the same position relative to the horizontal plane independent of the position of rotation of the hand-crank 76. In FIG. 6 the hand-crank is located in its rearwardmost position while the hand lever extends downwardly and somewhat to the rear. In FIG. 7 the hand-crank has been rotated to a position close to its forwardmost position while the brake lever is still oriented downwardly and somewhat to the rear. It will thus be appreciated that the use of the aforementioned coil springs helps to prevent the brake levers from winding or tangling around the hand-crank.

Figure 10:
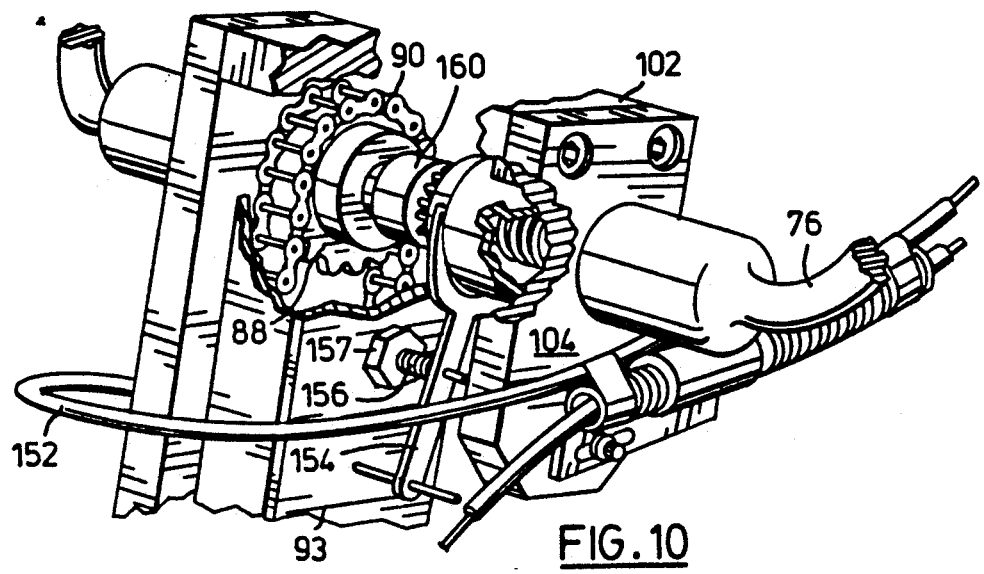
FIG. 10 is a detail view in perspective illustrating an optional feature for selectively locking the hand-crank.
Figure 11:
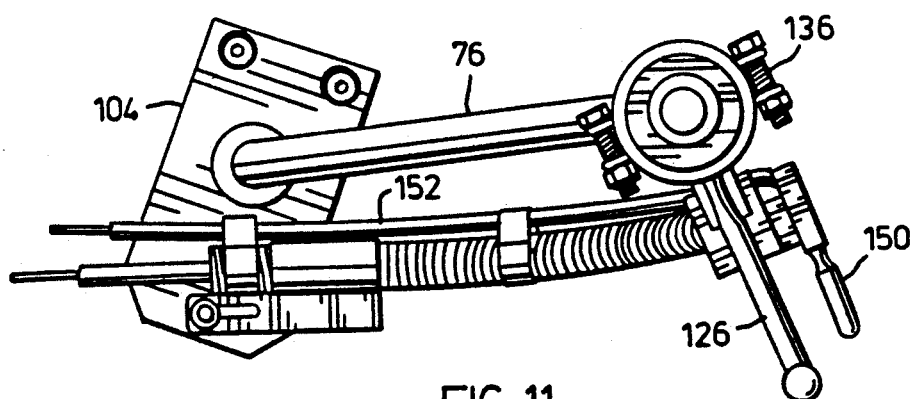
FIG. 11 is a side view of the hand-crank showing a lever for operating the locking device of FIG. 10.
Figure 12:
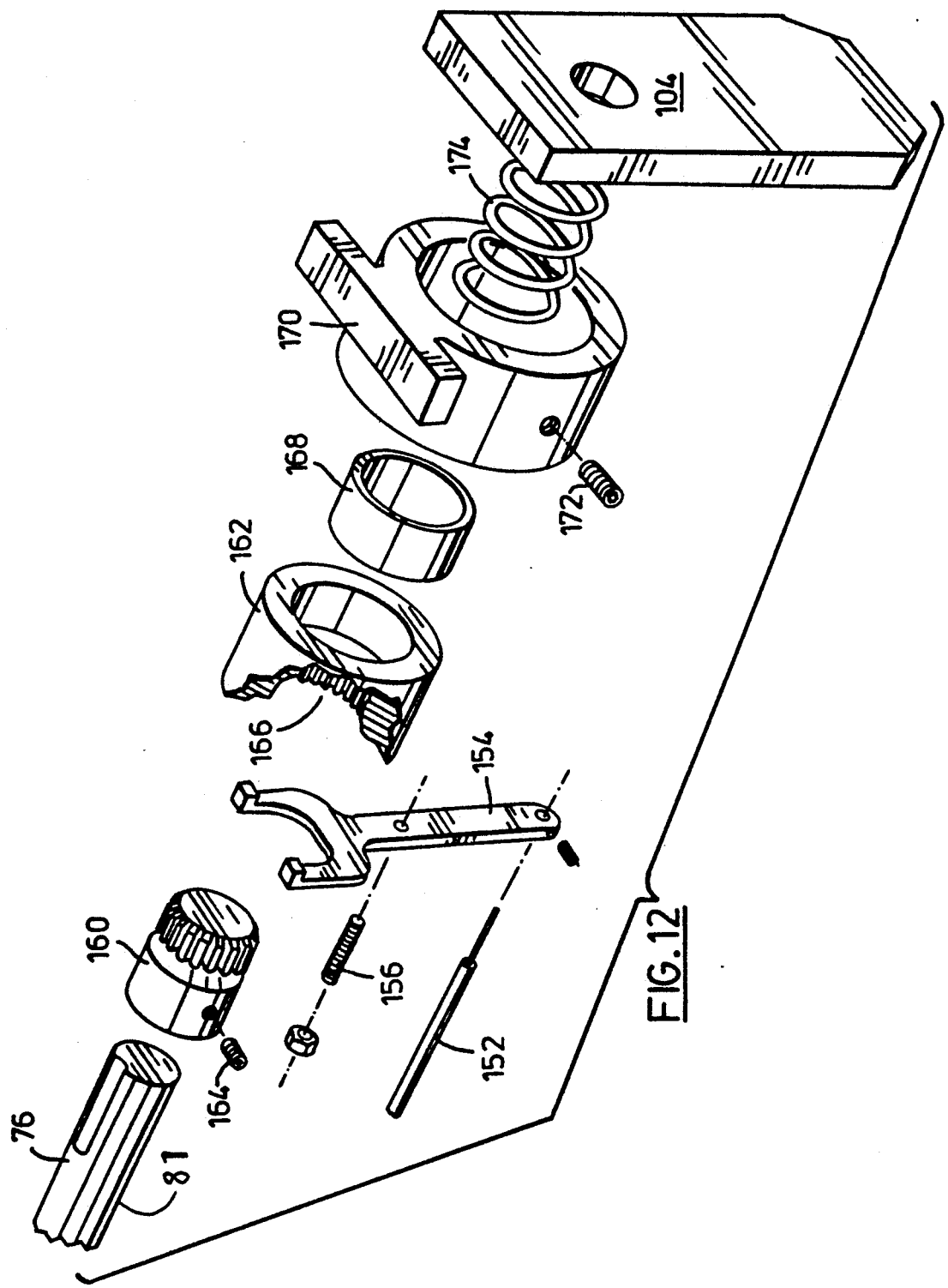
FIG. 12 is an exploded view showing the parts that make up the optional locking device.

An optional preferred feature of the present bicycle is illustrated in FIGS. 10 to 12 of the drawings. This feature comprises means for selectively locking the hand-crank 76 to prevent rotation thereof. Some users of the present bicycle may wish to use the bicycle in a conventional fashion with the hand-crank being used only to steer the bicycle. In order that the bicycle can be used in a completely conventional manner with the hand-crank 76 being rigidly connected to the steering spindle, the rider can use the illustrated locking device. For example the rider may wish to use this device when he or she is unsure of her ability to safely operate both drive systems. The use of the locking device might for example be desired in heavy or congested traffic conditions. In order to engage the device a hand operated lever 150 located near the right hand brake lever is operated. The lever 150 is operatively connected to a cable actuator 152. The opposite end of this actuator is connected to a fork 154 which is mounted to pivot by means of a fulcrum bolt 156. This fulcrum bolt is connected to a central section of the fork. The bolt is mounted by means of nut 157 to the side of the shield 93.

Turning now to the principle operating components of the locking device, there is a male gear 160 fixedly mounted on the hand-crank 76 and a non-rotating gear engaging member 162 mounted for sliding movement on the hand-crank. It will be understood that the hand-crank can thus be prevented from rotating by sliding the gear-engaging member 162 into positive engagement with the gear 160. The gear 160 is prevented from rotating on the hand-crank by means of a set screw 164. The member 162 has an internal gear 166 arranged in one half thereof while the other half provides a cylindrical seat for a bushing 168. The internal diameter of the bushing 168 is the same as the outer diameter of the hand-crank shaft. The member 162 fits inside a non-rotating slide block 170 and is prevented from rotating therein by means of a further set screw 172. It will be understood that the member 162 and the slide block 170 thus slide together on the shaft of the hand-crank 76. Compressive coil spring 174 extends around the hand-crank shaft and is arranged between the bushing side of the member 162 and the inner surface of leg 104. Thus the spring 174 urges the gear engaging member 162 into engagement with the gear 160. The slide block 170 is prevented from rotating by the provision of only a slight clearance between its flat top and a section 102 of the frame 98.

It will be readily understood that in order to disengage the member 162 from the male gear 160 and thus to unlock the hand-crank, the fork 154 is pulled by the actuator cable 152 by operating the lever 150. The fork is thereby pivoted on the fulcrum bolt and the Y of the fork pushes the body of the slide block 170 away from the male gear 160. The hand-crank can then be used to provide power to the rear wheel as well as to steer the bicycle.

It will thus be seen that the bicycle or velocipede of the present invention provides two drive mechanisms which can be used at the same time or separately and which permit very efficient use of available body strength and power. Also, by enabling power to be transmitted to the drive wheel from a hand-crank, the known problem of highly fluctuating foot power in the standard bicycle arrangement is alleviated. When both drive sources are being employed, the power transmitted will be smoother and this should result in greater speeds while being less tiring for the rider.

Furthermore, because the preferred form of the hand drive system is highly adjustable, the disclosed bicycle can be made so that it will accommodate riders of different sizes and capabilities. Further, if a rider wishes to simply pedal the bicycle in a normal fashion and to avoid using arm strength to provide power, he can do so easily because of the provision of the clutch 64 in the sprocket 36 and can employ the hand-crank simply to steer the bicycle in a relatively normal fashion. It will be appreciated that the hand-crank is not forced to rotate when the pedals 22 are in use. If a rider wishes to use the hand-crank only, the one way clutch 32 frees the sprockets 24 and 30 from the first shaft so that the pedals 22 will not rotate and can be used as a foot rest. This is important to permit good balancing of the bicycle when used in this mode.

It will be readily apparent to those skilled in the construction of bicycles and velocipedes that various modifications and changes can be made to the described bicycle without departing from the spirit and scope of the invention. Accordingly, all such modifications and changes as fall within the scope of the appended claims are intended to be part of this invention.

I therefore claim:

1. A dual drive bicycle comprising:
   a rigid frame including a steering post arranged forwardly on said frame;
   a steerable front wheel;
   means for rotatably mounting said front wheel to said frame including a generally upright steering spindle pivotably mounted in said steering post, said steering spindle and post defining a steering axis extending centrally therethrough;
   a rear wheel rotatably mounted on said frame;
   foot-powered drive means for said rear wheel including a first rotatable shaft extending transversely to said frame and mounted on said frame;
   a rotatable drive sprocket operatively connected to a rotatable second shaft supported by said steering post, said drive sprocket being spaced from said steering axis in the transverse direction of the bicycle;
   a rotatable driven sprocket mounted on said first shaft and capable of rotating same in a forward drive direction;
   a continuous drive chain extending about said drive sprocket and said driven sprocket;
   a third rotatable shaft mounted on said steering spindle so as to pivot with said front wheel when the latter is steered;
   a universal joint connecting said second and third shafts, said universal joint being positioned at a location above and substantially axially aligned with the steering axis of said steering spindle; and
   means for rotating said third shaft and hence said second shaft, said rotating means including a hand-crank.

2. A bicycle according to claim 1 wherein said means for rotating said third shaft includes another driven sprocket fixedly connected to said third shaft, another drive sprocket fixedly connected to said hand-crank to rotate therewith, and another continuous drive chain extending about said another driven sprocket and said another drive sprocket.

3. A bicycle according to claim 1 wherein said rotatable drive sprocket is connected to said second shaft by means of a one way drive clutch.

4. A bicycle according to claim 3 wherein said driven drive-sprocket is mounted on said first shaft by means of a one way drive clutch.

5. A bicycle according to claim 2 wherein said hand-crank comprises a U-shaped handlebar and two hand grips at opposite ends of said handlebar, said hand-crank being also usable to steer said bicycle.

6. A bicycle according to claim 2 including means for adjusting the position of both said hand-crank and the drive sprocket connected thereto in order to accommodate riders of different sizes.

7. A bicycle according to claim 6 wherein said hand-crank comprises a U-shaped handlebar and two hand grips at opposite ends of said handlebar, said hand-crank being also usable to steer said bicycle.

8. A bicycle according to claim 7 including hand-brake means mounted on said hand-crank and rotatable thereon.

9. A bicycle according to claim 1 including means for rotatably mounting said third shaft and said hand-crank, said shaft mounting means comprising a L-shaped bracket connected to said steering spindle, said hand-crank being mounted in a cantilever supporting frame connected to said bracket.

10. A bicycle according to claim 9 wherein the position of said hand-crank is adjustable by means for pivoting said cantilever supporting frame relative to said bracket.

11. A bicycle according to claim 1 including means for selectively locking said hand-crank to prevent rotation thereof.

12. A bicycle according to claim 1 including a gear fixedly mounted on said hand-crank and a non-rotating gear engaging member mounted for sliding movement on said hand-crank, wherein said hand-crank can be prevented from rotating by sliding said gear-engaging member into positive engagement with said gear.

13. A velocipede comprising:
a rigid frame including a steering post arranged forwardly on said frame;
a steerable front wheel;
means for rotatably mounting said front wheel to said frame including a generally upright steering spindle pivotable mounted in said steering post;
a rear wheel rotatably mounted on said frame;
hand-powered drive means for rotating one of said wheels, said drive means including a hand-crank rotatably mounted on said steering spindle;
brake means for arresting the forward motion of said velocipede;
brake operating means mounted on said hand-crank and operatively connected to said brake means, said operating means comprising at least one hand lever mounted on said hand-crank and capable of rotating thereon when said hand-crank is rotated; and
means for holding said at least one hand lever against gravity at a selected angular, non-vertical position on said hand-crank so that the angular position of the hand lever about a central axis of an adjacent handle of said hand-crank remains generally the same during rotation of said hand-crank.

14. A velocipede according to claim 13 wherein said brake operating means comprises two hand levers mounted on said hand-crank, both levers capable of rotating thereon when said hand-crank is rotated, said braking means comprises a first braking device for the front wheel and a second braking device for the rear wheel, and said two hand levers operate respective ones of the two braking devices.

15. In a velocipede having a frame, a steerable front wheel, means for rotatably mounting said front wheel on said frame for purpose of steering, said mounting means including a steering post, and a driven rear wheel, hand-powered drive means for said rear wheel, said drive means including a rotatable drive sprocket operatively connected to shaft means rotatably mounted on said frame, a rotatable driven sprocket operatively connected to said rear wheel in order to rotate same, a continuous drive chain extending about said drive and driven sprockets, means for rotating said shaft means, said rotating means including a hand-crank, wherein said shaft means comprises first and second shaft sections connected by a universal joint to permit said shaft means to bend as the velocipede is steered, said universal joint being located directly above and in substantial axial alignment with said steering post at the front of said frame.

16. A velocipede according to claim 15 wherein said first shaft section is rotatably and transversely mounted on said frame and said second shaft section is rotatably mounted on a steering spindle connected to said front wheel, said hand-crank being operatively connected to rotate said second shaft section.

17. A velocipede according to claim 16 wherein said rotating means includes a further drive sprocket fixedly connected to said hand-crank, a further driven sprocket fixedly connected to said second shaft section, and a further continuous drive chain extending about said further sprockets.

18. A velocipede according to claim 15 including a cantilever member for supporting said hand-crank and means for adjusting the position of said cantilever member and thereby said hand-crank to accommodate riders of different sizes.

19. A velocipede according to claim 15 including means for selectively locking said hand-crank to prevent rotation thereof.

20. A velocipede according to claim 13 wherein said brake operating means includes a brake cable and said holding means comprises a flexible coil spring through which at least a portion of said cable extends.

21. A velocipede according to claim 20 wherein said coil spring is connected to said drive means including means for adjusting the position of said coil spring relative to said drive means.

22. A velocipede comprising:
a rigid frame including a steering post arranged forwardly on said frame;
a steerable front wheel;
means for rotatably mounting said front wheel to said frame including a generally upright steering spindle pivotably mounted in said steering post;
a rear wheel rotatably mounted on said frame;
hand-powered drive means for rotating one of said wheels, said drive means including a hand-crank rotatably mounted on said steering spindle;
brake means for arresting the forward motion of said velocipede;
brake operating means mounted on said hand-crank and operatively connected to said brake means, said operating means comprising at least one hand lever mounted on said hand-crank and capable of rotating thereon when said hand-crank is rotated; and means for holding said at least one hand lever against gravity at a selected angular, non-vertical position on said hand-crank so that the angular postion of the hand lever about a central axis of an adjacent handle of said hand-crank remains generally the same during rotation of said hand-crank, wherein said brake operating means includes a sheathed brake cable and said holding means comprises a flexible coil spring through which a portion of said sheathed cable extends.

* * * * *